United States Patent
Kapaleeswaran et al.

(10) Patent No.: US 9,160,750 B2
(45) Date of Patent: Oct. 13, 2015

(54) COMMUNICATION ACCESS CONTROL SYSTEM

(75) Inventors: Viswanathan Kapaleeswaran, Karnataka (IN); Amitabh Saxena, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 51 days.

(21) Appl. No.: 14/345,325

(22) PCT Filed: Oct. 24, 2011

(86) PCT No.: PCT/IN2011/000731
§ 371 (c)(1),
(2), (4) Date: Mar. 17, 2014

(87) PCT Pub. No.: WO2013/061330
PCT Pub. Date: May 2, 2013

(65) Prior Publication Data
US 2014/0351888 A1    Nov. 27, 2014

(51) Int. Cl.
*H04L 29/06* (2006.01)
*H04L 12/58* (2006.01)

(52) U.S. Cl.
CPC .............. *H04L 63/101* (2013.01); *H04L 51/28* (2013.01); *H04L 29/06823* (2013.01); *H04L 29/06829* (2013.01); *H04L 51/38* (2013.01)

(58) Field of Classification Search
CPC ....... H04L 63/101; H04L 51/28; H04L 51/38; H04L 29/06823; H04L 29/06829
See application file for complete search history.

(56) References Cited

U.S. PATENT DOCUMENTS

| | | | |
|---|---|---|---|
| 6,983,327 B2 * | 1/2006 | Koperda et al. | 709/229 |
| 7,502,927 B2 | 3/2009 | Trostle et al. | |
| 7,630,986 B1 | 12/2009 | Herz et al. | |
| 8,000,241 B2 * | 8/2011 | O'Neill | 370/235 |
| 2010/0146093 A1 | 6/2010 | Kuik | |

FOREIGN PATENT DOCUMENTS

| | | |
|---|---|---|
| CN | 1608391 A | 4/2005 |
| CN | 101146027 A | 3/2008 |

OTHER PUBLICATIONS

International Preliminary Report on Patentability, May 8, 2014, PCT Patent Application No. PCT/IN2011/000731, Filed Oct. 24, 2011.
(Continued)

*Primary Examiner* — Krisna Lim
(74) *Attorney, Agent, or Firm* — Hewlett-Packard Patent Department

(57) ABSTRACT

A communication access control system includes a messaging service facility and a computing system. The computing system has a permanent memory and hosts a plurality of access control cells (each having an input and an output address); a messaging service to send messages between at least some of the access control cells; and a control service to define a link. The link is selected from a C-link, an F-link, and a Q-link. The C-link connects the output address of a first read-write cell of the access control cells to the input address of a second read-write cell of the access control cells. The F-link connects a forwarder address to the input address of at least one of the access control cells. The Q-link connects the output address of at least one of the access control cells to a queue address.

15 Claims, 6 Drawing Sheets

(56) References Cited

OTHER PUBLICATIONS

English translation (machine-generated) of Abstract from Chinese Patent Publication No. 101146027A [retrieved on Mar. 12, 2014], Retrieved from the Internet: <http://worldwide.espacenet.com/publicationDetails/biblio?DB=worldwide.espacenet.com&II=0&ND=3&adjacent=true&locale=en_EP&FT=D&date=20080319&CC=CN&NR=101146027A&KC=A>.

English translation (machine-generated) of Abstract from Chinese Patent Publication No. 1608391A [retrieved on Mar. 12, 2014], Retrieved from the Internet: <http://worldwide.espacenet.com/publicationDetails/biblio?DB=worldwide.espacenet.com&II=0&ND=3&adjacent=true&locale=en_EP&FT=D&date=20050420&CC=CN&NR=1608391A&KC=A>.

International Search Report and Written Opinion, Mar. 29, 2012, PCT Patent Application No. PCT/IN2011/000731.

Li et al., Secure Message Distribution Scheme with Configurable Privacy for Heterogeneous Wireless Sensor Networks, IEEE/IFIP International Conference on Embedded and Ubiquitous Computing, Dec. 2008, pp. 10-15.

Saxena, Decentralized Security Services, Dissertation [online], University of California, Irvine, California, Summer 2006, Retrieved from the Internet <http://spies.poly.edu/~nsaxena/docs/thesis.pdf> [retrieved on Sep. 12, 2011], 194 pages.

* cited by examiner

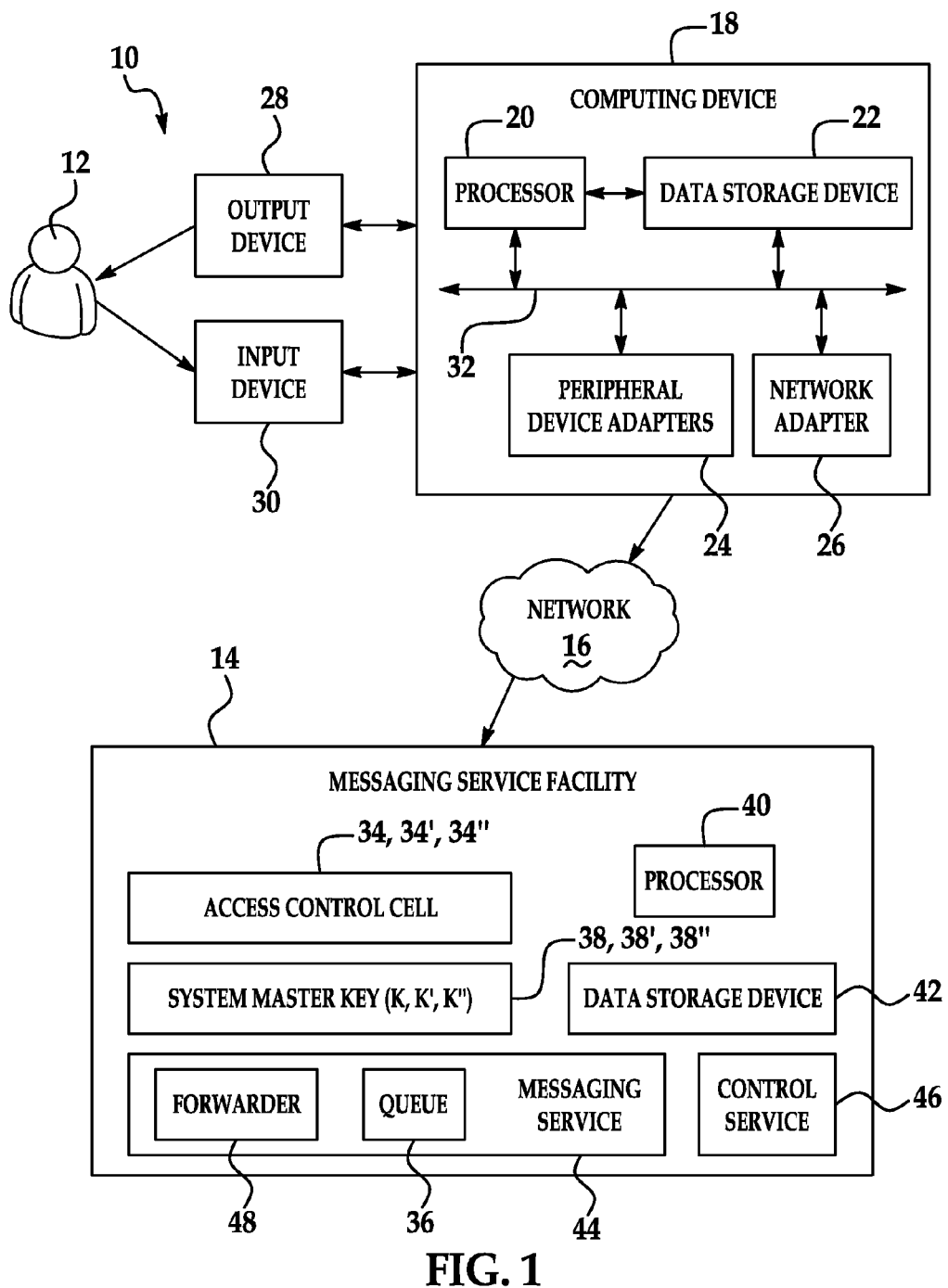
FIG. 1
FIG. 2

COMMUNICATION ACCESS CONTROL SYSTEM

BACKGROUND

The present disclosure relates generally to a communication access control system.

Distributive computing is a method of computing in which tasks are divided into relatively smaller sub-tasks, which are then distributed across a network of computing devices for simultaneous processing of each sub-task. Distributive computing has been found in a myriad of applications and systems such as, for example, social networking, online digital mapping, video-sharing websites, and advanced collaboration software. However, there is generally a lack of built-in security mechanisms that are implemented when operating these applications.

Access Control Lists (ACL) have been used to provide group security management. An access control list provides a list of authorized entities as well as every object in the system. An access control monitor may look to the list and determine what entities can or cannot access, share or destroy any certain object. Use of this type of group security management requires a reasonable level of expertise, and thus does not offer a simple method to realize messaging control. Furthermore, before consulting the Access Control List (ACL), the access control monitor may need to verify the claimed identity of the entity that sent the access request. This may add additional complexity to the tasks performed by the access control monitor and may increase the amount of effort that needs to be set forth by the access control monitor.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic diagram of an example of a system for communication access control over a distributed computing environment;

FIG. 2 is a schematic diagram of an example of an access control cell;

DETAILED DESCRIPTION

Figure 3A:
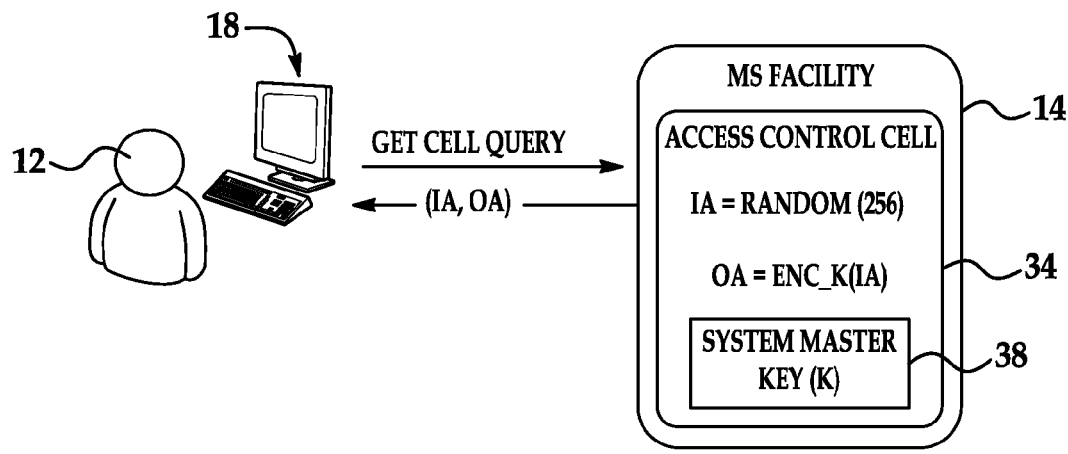
FIGS. 3A through 3C are schematic diagrams illustrating different examples of how a user of the communication access control system can obtain a read-write (RW) cell, a read (R) cell, and a write (W) cell, respectively.

The communication access control system disclosed herein is a cryptographic system that utilizes a set of access control primitives for realizing secure, cryptographic, and capability-based naming, access, and protection. Examples of the system include a trusted central facility which is the security micro-kernel for a distributed message passing system between many clients. The trusted central facility offers a messaging service and a control service that are decentralized so that clients can create and manage groups and group communications without interference from the trusted central facility. The central facility may possess a secret cryptography key which may be stored and used within, for example, a piece of trusted hardware that is connected to the Internet via a suitable server. With this cryptography key, a user may securely pass messages with many other users in real time.

The central facility includes a number of cells which are dynamically created when needed based on a number of cryptographic rules. These cells include an input address IA and an output address OA, both of which are randomized cryptographic numbers. The cell represents a communication capability described by the tuple (IA, OA) such that the output address cannot be computed knowing the input address, and visa versa, without the possession of the secret cryptography key mentioned above. Users or entities in possession of the input address IA can send or write messages to the cell, and entities in possession of the output address OA can receive or read messages from the cell. However, entities in possession of the input address IA without the output address OA cannot receive or read messages from the cell, and entities in possession of the output address OA without the input address IA cannot send or write messages to the cell. In this way, the central facility provides assurances to the users that messages sent to random cells will be dropped without ever being read.

Each cell is a virtual switchboard that users of the central facility may use to virtually connect or disconnect their computing devices. A variety of links may be formed, directly or indirectly, between the cells, thus enabling the formation of groups that contain different users, and in some instances, different devices. Using well defined control messages through the system disclosed herein, one can control the ability of devices to read and/or write within one or more groups.

Referring now to FIG. 1, a diagram of an example of the communication access control system 10 is shown. In this example and for purposes of simplicity in illustration, a user/client 12 may gain access to the trusted central facility, referred to herein as the messaging service (MS) facility 14, through a network 16 using a computing device 18. As an example, the MS facility 14 and the computing device 18 may communicate using XMPP protocol over a secure one-way authenticated channel. In this example, the MS facility has a certified public key that the user/client trusts. However, the principles set forth herein extend equally to any alternative configurations in which the computing device 18 may obtain access to the MS facility 14. In an example, the computing device 18 may include the MS facility 14 and thereby allow the user 12 to directly access the MS facility 14 through the computing device 18 without going through the network 16.

While a single user 12 and a single computing device 18 are shown in FIG. 1, it is to be understood that many other users and/or devices may also gain access to the MS facility 14 through similar methods. In the group examples disclosed herein (see, e.g., FIGS. 7 through 10), at least two users and/or computing devices gain access to the MS facility 14 in order to securely read and/or write messages to the group.

FIG. 1 illustrates a web-based or cloud computing infrastructure. The "cloud" is a computer network accessible over the Internet and/or web that is dynamically scalable with virtualized resources, such as printing resources. In an example, the cloud may or may not be physically distributed. User 12 is not required to have knowledge or expertise in the infrastructure of the cloud that relies on the Internet to satisfy his/her computing needs. The cloud provides the services of the MS facility 14 that are accessible from a web browser while software and data are stored on servers in the cloud. Whether part of a cloud computing infrastructure or a stand-alone server or workstation, it is to be understood that the MS facility 14 hosts cells, links, and other communication tools (e.g., queues, forwarders, etc.) on a computing system which includes a processor 40 and a permanent memory (e.g., data storage device 42).

The computing device 18 may be any device that achieves the desired functionality of, at least, sending data to and receiving data from the MS facility 14. Examples of the computing device 18 include desktop computers, laptop computers, cell/smart phones, personal digital assistants (PDAs), as well as other computing devices capable of being connected to the network 16. To achieve its desired functionality, the computing device 18 includes various hardware components. Such hardware components may include, for example, a processor 20, a data storage device 22, peripheral device adapters 24, a network adapter 26, an output device 28, and an input device 30. These hardware components may be interconnected through the use of a number of busses and/or network connections. In an example, the processor 20, data storage device 22, peripheral device adapters 24, and network adapter 26 may be in communication via bus 32.

The processor 20 may include the hardware architecture for retrieving executable code (i.e., computer readable instructions) from the data storage device 22 and executing the executable code. The executable code may, when executed by the processor 20, cause the processor 20 to implement at least the functionality of sending data to and receiving data from the MS facility 14. In the course of executing code, the processor 20 may receive input from and provide output to a number of the remaining hardware units.

In an example, the computing device 18, and specifically the processor 20 may send a query to the MS facility 14 to obtain an access control cell 34 (or 34' or 34" described in reference to FIGS. 3B and 3C, respectively) or to discover link(s) within the system 10, and when applicable, may share an input address, an output address, or both with other users of the system 10. The processor 20 may also receive messages from an access control cell 34, 34', 34" or a queue 36 after the access control cell 34, 34', 34" or the queue 36 has received a message from another user and mechanically computed and forwarded the message to the user 12.

The data storage device 22 may store data, such as an access control cell 34, 34', 34". FIG. 1 depicts the access control cell 34, 34', 34" as being part of the MS facility 14, but it is to be understood that the access control cell 34, 34', 34" may also be stored on the data storage device 22 of each of the users' computing devices 18. The data storage device 22 may store a number of access control cells 34, 34', 34". In an example, the data storage device 22 saves the cells in the form of a database for easy retrieval when the access control cell 34, 34', 34" is accessed by the user 12.

The data storage device 22 may include various types of memory modules, including volatile and nonvolatile memory. As an example, the data storage device 22 may include Random Access Memory (RAM), Read Only Memory (ROM), and Hard Disk Drive (HDD) memory. It is believed that other types of memory may also be used. In some instances, different types of memory in the data storage device 22 may be used for different data storage needs. For example, the processor 20 may boot from Read Only Memory (ROM), maintain nonvolatile storage in the Hard Disk Drive (HDD) memory, and execute program code stored in Random Access Memory (RAM).

Generally, the data storage device 22 may be a non-transitory, tangible computer readable storage medium. For example, the data storage device 22 may be an electronic, magnetic, optical, electromagnetic, infrared, or semiconductor system, apparatus, or device, or any suitable combination thereof. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination thereof.

A messaging client application programming interface may be stored on the data storage device 22. This interface allows the user to access the various services offered through the MS facility 14 (including access control cell management, group management, access control cell transferability, and user public key management). The interface may include drop menus, drag and drop icons, or other pictorial representations so that users 12 can easily create groups using the MS facility 14.

The peripheral device adapter 24 may provide an interface to the input 30 and output 28 devices to create a user interface and/or access external sources of memory storage. An input device 30 (e.g., keyboard or keypad, mouse, touchscreen, etc.) may be provided to allow a user to interact with the MS facility 14. The peripheral device adapter 24 may also create an interface between the processor 20 and a printer, a display device, or another output device.

The network adapter 26 may provide an interface to the network 16, thereby enabling the transmission of data to and receipt of data from the MS facility 14. Specifically, the network adapter 26 may enable the transmission of an access control cell 34, 34', 34" or different addresses between the computing device 18 and the MS facility 14.

The MS facility 14 may include a processor 40 and a data storage device 42 similar to the processor 20 and data storage device 22 within the computing device 18 previously described. As will be discussed further hereinbelow, the processor 40 may be used to compute an input address and an output address when appropriate, a forwarder address when appropriate, a queue address when appropriate, and run queries when appropriate. Additionally, the data storage device 42 may be used to store both a cryptographic key 38 (also referred to as the system master key K and described further in reference to FIGS. 2 and 3A-3C) and access control cell(s) 34, 34', 34".

The MS facility 14 also includes a messaging service 44 and a control service 46. The messaging service 22 allows clients 12 to send messages to one or more other clients. The control service 46 allows clients 12 to perform communication control (e.g., read control and/or write control). These services may be embodied on a single server of the facility 14 or multiple servers of the facility 14.

The messaging service 22 includes at least a forwarder 48 and a queue 36, and a set of queries for writing to the forwarder 48 and reading from the queue 36. The forwarder 48 includes computer readable instructions (embedded on a non-transitory, tangible computer readable medium) that copy message(s) received at the forwarder 48, and transmit the copied message(s) to multiple cells 34, 34', 34" that are linked to the forwarder 48. The forwarder 48 enables a user 12 to generate a single message and have it sent to multiple different cells 34, 34', 34". The forwarder 48 is associated with a forwarder address that can be attached to the input address of one or more cells 34, 34', 34" of the same or different type. In an example, the forwarder address is a cryptographic number which may be 256-bits long. It is to be understood that the forwarder address may be any sized number, and that larger numbers tend to provide more security. The forwarder 48 and how it may be used in messaging will be described further hereinbelow.

The queue 36 includes computer readable instructions (embedded on a non-transitory, tangible computer readable medium) that retrieve messages sent to a cell 34, 34', 34" associated with the queue 36 from one or more cells 34, 34', 34" of the same or different type. The queue 36 enables a user 12 to retrieve all of his/her messages that have been sent from multiple different cells 34, 34', 34". The queue 36 involves a push model of messaging, where any connected computing device 18 linked to the queue 36 receives incoming messages without having to poll the MS facility 14. If the linked computing device 18 is not connected when messages are received, the queue 36 is programmed to store the messages (e.g., in the data storage device 42 of the MS facility 14). The queue 36 is associated with a queue address that can be attached to the output address of one or more cells 34, 34', 34" of the same or different type. In an example, the queue address is a cryptographic number which may be 256-bits long. It is to be understood that the queue address may be any sized number, and that larger numbers tend to provide more security. The queue 36 and how it may be used in messaging will be described further hereinbelow.

It is to be understood that the messaging service 22 does not acknowledge message delivery, but rather may be programmed to send an acknowledgement that the message has been accepted into the system 10. Whether the message is delivered and to whom is determined by the communication control policies set by the user 12 and/or manager of a group using the control service 46. The control service 46 defines the links between the cells 34, 34', 34", queues 36, and forwarders 48, as well as the set of queries for adding, removing and discovering these links.

As indicated in FIG. 1, the access control cell 34, 34', 34" is an intricate component of the system 10. FIG. 2 is a diagram of an example of the access control cell 34, 34', 34". In general, the access control cell 34, 34', 34" receives an input address from and provides an output address to various users of the system 10. More specifically, with the input address, a user may have the authority to write messages to the cells 34 and 34", and with the output address, a user may have the authority to read messages written to the cells 34 and 34'. In order to allow for interaction with other users, the input address alone or output address alone may be provided to the other users. The interaction among users will be described in more detail in connection with FIGS. 3A through 10.

The input address and output address may be cryptographic numbers which may be 256-bits long. In an example, the input address and output address are related by a secure permutation such as that defined by a symmetric key encryption algorithm under the effect of the system master key 38 (see FIG. 1). In one example, the output address (OA) may be defined by the following equation:

$$OA = ENC\_K(IA) \qquad \text{eq. (1)}$$

In this equation (eq. (1)), the input address, denoted by the term "IA," is drawn from a cryptographically secure Pseudo-Random Bit Generator (PRBG) and ENC is a symmetric encryption method such as, for example, $AES_{256}{}^{13}$. As such, in some instances, the access control cell 34 represents a communication capability described by the tuple (IA, OA) such that OA cannot be computed knowing IA and visa versa without the possession of the system master key 38 denoted in the above formula by the term "K." As a result, those users alone that possess the input address can send or write messages to the access control cell 34 and those users alone that possess the output address can receive or read messages from the access control cell 34.

In other examples, instead of a secret cryptography key, the user 12 may send a public key (denoted by the letter "Y"). With the public key Y, the MS facility 14 may compute an output address OA or an input address IA using a hash function based on the public key Y. Therefore, the user 12 may share the public key instead of a cell address, with those users with whom the user 12 may wish to interact.

Figure 3B:
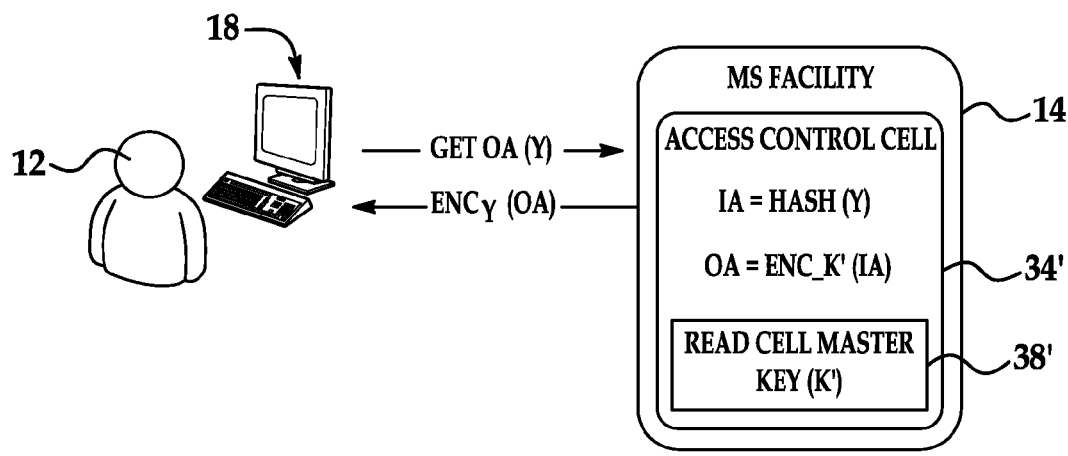
Figure 3C:
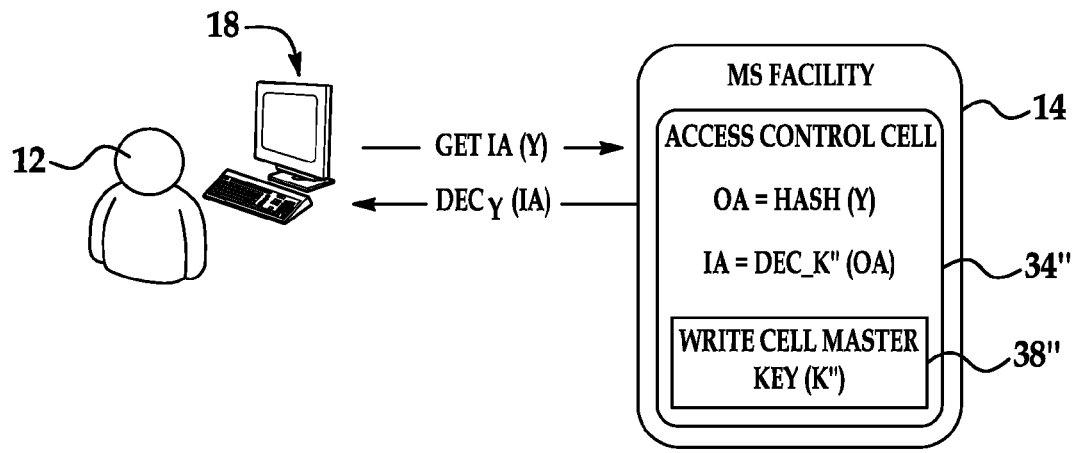

Referring now to FIGS. 3A through 3C, different scenarios of the user 12 obtaining input and/or output addresses IA, OA for the respective cells 34, 34', 34" using the MS facility 14 are depicted. As will be discussed further in reference to FIGS. 4-10, the access control cells 34, 34', 34" may be implemented in a variety of applications to enable group communications.

FIG. 3A illustrates the user obtaining a cell 34 and the corresponding input and output addresses using a get cell query message. The user 12 may send a get cell query message to the MS facility 14, in the form of, for example, an HTTP message or a confidential and secure messaging system which can assure that the message remains confidential. In response to a get cell query message, the user 12 may obtain an input address IA and an output address OA from the MS facility 14. More specifically, when the user 12 sends a get cell query message to the MS facility 14, the MS facility 14 generates a random access control cell 34 which contains a randomized input address IA and a randomized output address OA. The MS facility 14 may generate the input address IA and output address OA using a number of equations. In an example, the input address IA may be generated using a symmetric encryption method such as, for example, the US National Institute of Standards and Technology's Advanced Encryption Standard with a key size of 256 bits ($AES_{256}{}^{13}$) (i.e., IA=RANDOM(256)). Additionally, in an example, the output address OA may be generated by encrypting the randomly generated input address IA using the system master key K, 38 (i.e., OA=ENC_K(IA)).

The cell 34 associated with the randomly generated input and output addresses IA, OA are read-write cells, and thus the user 12 may use the input address IA to control who may send messages to the cell 34 and may use the output address OA to control who may read messages sent to the cell 34.

Once the user 12 has obtain the randomized input address IA and output address OA, the user 12 may send the input address IA to another system user. This scenario is not depicted in FIG. 3A. With the knowledge of the input address IA, the other user, through an appropriate computing device may send a message containing the input address IA to the access control cell 34. The access control cell 34 may then know, through the attached input address IA, that the sender of the message is authorized to have the message sent to the user 12. As the other user sends the message to the access control cell 34 along with the input address IA, the MS facility 14 mechanically computes the output address OA by encrypting the attached input address IA using the system master key K, 38, i.e. OA=ENC_K(IA). After the MS facility 14 has converted the input address IA to the output address OA using the system master key K, 38, the access control cell 34 may then allow the message to be forwarded onto the user 12. Therefore, the user 12 listening for a message containing the specific output address OA will receive and be able to read the message sent by the other user. Indeed, in this way, the user 12, by sharing the input address IA with those who he or she wishes to receive messages from, may receive those messages in a secure manner.

Once the user 12 has obtain the randomized input address IA and output address OA, the user 12 may send the output address OA to another system user. This scenario is not depicted in FIG. 3A. With the knowledge of the output address OA, the other user, through an appropriate computing device may receive a message containing the input address IA to the access control cell 34. The access control cell 34 may then know, through the attached input address IA, that the receiver of the message is authorized to have the message forwarded to them by the user 12. As the other user receives the message from the access control cell 34 along with the input address IA, the MS facility 14 mechanically computes the output address OA by encrypting the attached input address IA using the system master key K, 38, i.e. OA=ENC_K(IA). Therefore, the system master key K, 38 is kept secret by the MS facility 14. After the MS facility 14 has converted the input address IA to the output address OA using the system master key K, 38, the access control cell 34 may then allow the message to be forwarded onto the other user. Therefore, the other user listening for a message containing the specific output address OA will receive and be able to read the message sent by the user 12. Indeed, in this way, the user 12, by sharing the output address OA with only those who he or she wishes to send messages to, may send those messages in a secure manner.

The user 12 may additionally be given the ability to revoke the capability to send or receive messages from individuals without affecting the capability of other users. In an example, the user 12 may direct the system 10 to stop receiving messages from cells 34 having a specific output address OA corresponding to the previously shared input address IA. In another example, the user 12 may direct the system 10 to stop sending messages to a cell 34 having a specific input address IA corresponding to the previously shared output address OA.

It is to be understood that any number of access control cells 34 may be created by the user 12 sending a get cell query message, where each cell 34 contains a different input address IA and corresponding output address OA.

FIG. 3B illustrates the user 12 obtaining a cell 34' and corresponding input and output addresses IA, OA that give him/her the ability to control who is allowed to read from the cell 34'. As such, this cell 34' may be referred to as a read cell. The read cell 34' is an identification-based access control cell. In the scenario presented in FIG. 3B, the user 12 may be send his or her public key Y to the MS facility 14 to obtain a non-random input address (IA=HASH(Y)) and an encrypted output address OA corresponding to the user's public key Y (OA=ENC_K'(IA)). More specifically, the user 12 may send a get address query message to the MS facility 14. This particular get address query message is a query to receive an output address OA based on the user's public key Y. In an example, the public key Y may be some random value provided to the user 12 of the system 10. In another example, the public key may be chosen by the user 12 and may remain confidential between the MS facility 14 and the user 12, as well as between the user 12 and those other users 12 whom he or she wishes to interact with. The get address query message may be sent, for example, in the form of an HTTP message or confidential and secure messaging system which can assure that the message remains confidential.

In the scenario depicted in FIG. 3B, once the get address query message has been sent, an access control cell 34' may be generated, and the output address OA will be computed and sent back to the user 12. The MS facility 14 (e.g., via processor 40) may first calculate the input address IA by applying the public key to a hash function. The hash function may be any hash function, an example of which includes SHA3, which has a 256-bit output. Additional hash functions may be used. Other suitable hash functions are those that output values having an address size of 256-bits or some other desirable number of bits.

After the input address IA is calculated using the hash function and the public key Y, the output address OA may be calculated using the input address and a read cell secret key K', 38'. The secret key K', 38' used for a read cell 34' is different from the secret key K, 38 used for a read write cell 34. For example, output address OA may be generated by encrypting the input address IA using the read cell master key K', 38'. This ensures that only users/entities with knowledge of the read cell master key K', 38' can compute the output address OA for the R-cell 34'.

For a read cell 34', the user 12 may share his/her public key Y so that any user/entity having the public key Y can compute, using his/her computing device 18, the input address IA as the output of the hash function, and write to the cell 34' using the input address IA. More particularly, the user/entity wishing to write to the cell 34' may use the user's provided public key Y as the input of the hash function to obtain the input address IA. As stated above, however, only users/entities with knowledge of the read cell master key K', 38' (e.g., the MS facility 14) can compute the output OA for the given read cell 34', and thus can control the ability to read from the given read cell 34'.

FIG. 3C illustrates the user 12 obtaining a cell 34" and corresponding input and output addresses IA, OA that give him/her the ability to control who is allowed to write to the cell 34". As such, this cell 34" may be referred to as a write cell. Like the read cell 34', the write cell 34" is also an identification-based access control cell. In the scenario presented in FIG. 3C, the user 12 may be send his or her public key Y to the MS facility 14 to obtain a non-random output address OA (OA=HASH(Y)) and an encrypted input address IA corresponding to the user's public key Y (IA=DEC_K" (OA)), where DEC_K"( ) is the decryption function corresponding to ENC_K"( ). More specifically, the user 12 may send a get address query message to the MS facility 14. This particular get address query message is a query to receive an input address IA based on the user's public key Y. In an example, the public key Y may be some random value provided to the user 12 of the system 10. In another example, the public key may be chosen by the user 12 and may remain confidential between the MS facility 14 and the user 12, as well as between the user 12 and those other users 12 whom he or she wishes to interact with. The get address query message may be sent, for example, in the form of an HTTP message or confidential and secure messaging system which can assure that the message remains confidential.

In the scenario depicted in FIG. 3C, once the get address query message has been sent, an access control cell 34" may be generated and the input address IA will be computed and sent back to the user 12. The MS facility 14 (e.g., via processor 40) may first calculate the output address OA by applying the public key to a hash function. The hash function may be any hash function, an example of which includes SHA3, which has a 256-bit output. Additional hash functions may be used. Other suitable hash functions are those that output values having an address size of 256-bits or some other desirable number of bits.

After the output address OA is calculated using the hash function and the public key Y, the input address IA may be calculated using the output address OA and a write cell secret key K", 38". The secret key K", 38" used for a write cell 34" is different from the secret key K, 38 used for a read write cell 34 and from the secret key K', 38' used for a read cell 34'. It is to be understood that each of the secret keys K, 38 and K', 38', and K", 38" are independently selected. For example, input address IA may be generated by encrypting the output address OA using the write cell master key K", 38". This ensures that only users/entities with knowledge of the write cell master key K", 38" can compute the input address IA for the write cell 34", and thus control the ability to write to the cell 34".

For a write cell 34", the user 12 may share his/her public key Y so that any user/entity having the public key Y can compute, using his/her computing device 18, the output address OA as the output of the hash function, and read from the cell 34" using the output address OA. More particularly, the user/entity wishing to read from the cell 34" may use the user's provided public key Y as the input of the hash function to obtain the output address OA. As stated above, however, only users/entities with knowledge of the write cell master key K", 38" (e.g., the MS facility 14) can compute the input address IA for the given write cell 34", and thus can write to the given write cell 34".

Figure 4:
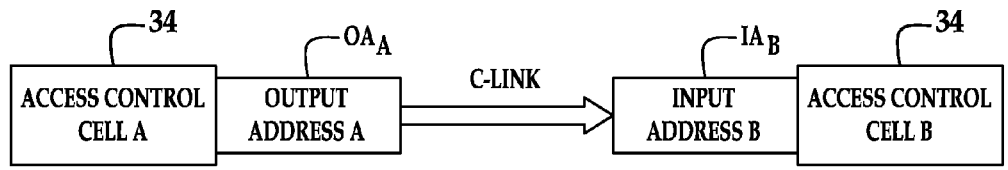
FIG. 4 is a schematic diagram illustrating an example of a C-link.
Figure 5:
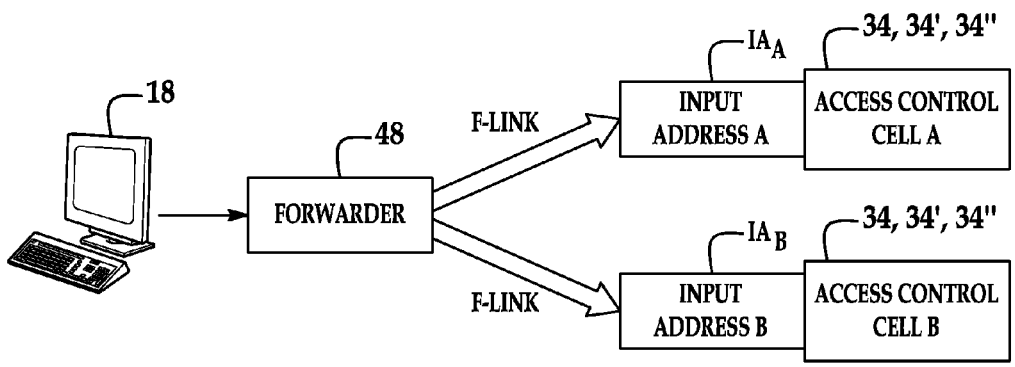
FIG. 5 is a schematic diagram illustrating an example of an F-link.
Figure 6:
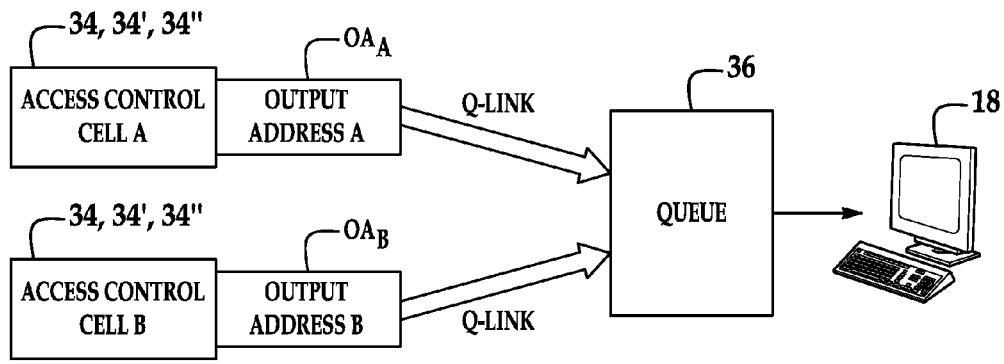
FIG. 6 is a schematic diagram illustrating an example of a Q-link.

The MS facility 14 disclosed herein enables various links to be generated between cells 34, 34', 34". The links may be stored on a permanent memory, for example, the storage device 42 at the MS facility 14. As mentioned above, a user 12 may create links and/or control links using the control service 46. FIGS. 4-6 illustrate examples of three links that are allowed by the MS facility 14, namely a C-link (FIG. 4), an F-link (FIG. 5), and a Q-link (FIG. 6).

FIG. 4 illustrates the C-link, which connects two read-write control access cells 34 (e.g., cells A and B in FIG. 4). The C-link is defined as a tuple $(OA_A, IA_B)$ that links the output address $OA_A$ of one read-write control access cell 34 (e.g., cell A) to the input address $IA_B$ of another read-write control access cell 34 (e.g., cell B). The C-link allows the read-write control access cell 34, A to forward messages to the other read-write control access cell 34, B. Via the C-link, any messages coming out from the output address OA of one read-write control access cell 34, A can be sent to the input address IA of another read-write control access cell 34, B.

The C-link may be added or removed (e.g., by a user 12, who may be an individual and/or group manager) by sending an appropriate query to the MS facility 14, where the control service 46 in conjunction with the processor 40 process the query and generate a link or delete the link when the appropriate information is provided by the user 12. Each of the add C-link query and the delete C-link query require the output address $OA_A$ of the sending cell 34, A and the input address $IA_B$ of the receiving cell 34, B. The user 12 requesting the addition/deletion also has to prove ownership of the sending cell 34, A by providing the input address $IA_A$ of the cell 34, A in addition to the output address $OA_A$. As such, to make or break a C-link, the query includes $((IA_A, OA_A), IA_B)$. The C-link is a form of forward linking, at least in part because the user 12 of the sending cell 34, A controls the link.

The C-links in the system may also be labeled by the user 12 creating the link. The available labels may depend upon the system-wide settings. Example labels include user-defined labels, system-generated unique random labels (e.g., a pseudo-random number generated from the $(OA_A, IA_B)$ tuple using a one-way function), or the username of the user 12 creating the C-link. Each type of label is designed to cater to specific needs of various applications. If a label is attached to a C-Link, then this label may be appended to all messages passing over this link. Thus, receivers (e.g., cell 34, B) of the message can know the path information. In some instances however, the C-link is not labeled (e.g., anonymous links). Depending upon the system 10 settings, the user 12 creating the C-link may add the label when creating the C-link.

The control service 46 of the MS facility 14 may also be programmed to allow C-links to be viewed by certain user(s) 12. The control service 46 in conjunction with the processor 40 process a query that specifies the input and output addresses $IA_A, OA_A$ of the sending cell 34, A. C-links may not be viewed when the query includes the input address $IA_B$ of the receiving cell 34, B. As such, when a user 12 wishes to view all C-links associated with his/her cell, he/she may send a get C-link query to the MS facility 14 which includes his/her cell input and output addresses $IA_A, OA_A$. The user 12 may send the get C-link query message (e.g., GetCLinks($IA_A, OA_A$)) to the MS facility 14, in the form of, for example, an HTTP message or a confidential and secure messaging system which can assure that the message remains confidential. The MS facility 14 takes the valid cell address tuple and outputs all of the input addresses (e.g., $IA_B$) linked to the cell 34, A.

FIG. 5 illustrates the F-link, which connects a forwarder 48 (which is associated with a computing device 18 of a user 12) to multiple cells 34, 34', 34" of any type (i.e., read-write, read, or write). As mentioned above, the forwarder 48 has a single forwarder address FA that is provided to and known by the user 12 that is associated with the forwarder 48. It is to be understood that the user 12 may share the forwarder address FA with other users so that multiple users may use the forwarder 48 associated with the shared forwarder address FA. The F-link is defined as a tuple (FA, IA, type), where the type indicates whether the receiving cell is a read-write cell 34, a read cell 34', or a write cell 34". As such, the F-link denotes the link(s) between a forwarder 48 and one or more input addresses (e.g., $IA_A, IA_B$). The F-link allows a user 12 to send a message to the forwarder 48, which will copy the message and send it to any input address (e.g., $IA_A, IA_B$) that is linked to the forwarder 48.

A user 12 may obtain a forwarder address FA via one of two modes. Using the first mode, the user 12 sends a get forwarder address query to the MS facility 14. In response, the MS facility 14 (via processor 40) may compute a forwarder address FA and securely transmit it to the user 12 via his/her computing device 18. Once the user has his/her forwarder address FA, he/she may generate or delete F-links as described below. Using the second mode, the user sends one or more input addresses and corresponding cell types to the MS facility 14 requesting that a forwarder 48 be generated for the listed input address(es). In response, the MS facility 14 (via processor 40) may compute a forwarder address FA, securely transmit it to the user 12 via his/her computing device 18, and generate the requested F-links using the newly generated forwarder address FA.

The F-link may be added or removed (e.g., by a user 12, who may be an individual and/or group manager) by sending an appropriate query to the MS facility 14, where the control service 46 in conjunction with the processor 40 process the query and generate a link or delete the link when the appropriate information is provided by the user 12. Each of the add F-link query and the delete F-link query require the forwarder address FA, the input address $IA_A$ or $IA_B$ of the receiving cell 34, 34', 34", A or B, and the cell type of the receiving cell 34, 34', 34", A or B. To make or break an F-link between the forwarder 48 and cell A, the query would include (FA, $IA_A$, cell type of A). Similarly, to make or break an F-link between the forwarder 48 and the cell B, the query would include (FA, $IA_B$, cell type of B). Generically, to link or unlink a forwarder 48 to or from a cell 34, 34', 34", the tuple (FA, IA, cell type associated with IA) is provided to the MS facility 14.

The control service 46 of the MS facility 14 may also be programmed to allow F-links to be viewed by certain user(s) 12. The control service 46 in conjunction with the processor 40 allows viewing of the F-links associated with a forwarder 48 by processing a query that specifies the forwarder address FA. F-links may not be viewed when the query includes the input address(es) $IA_A$ or $IA_B$ of the receiving cells 34, 34', 34", A or B. As such, when a user 12 wishes to view all F-links associated with his/her forwarder 48, he/she may send a get F-link query to the MS facility 14 which includes his/her forwarder address FA. The user 12 may send the get F-link query message (e.g., GetFLinks(FA)) to the MS facility 14, in the form of, for example, an HTTP message or a confidential and secure messaging system which can assure that the message remains confidential. The MS facility 14 takes the valid forwarder address and outputs all of the input addresses (e.g., $IA_A$, $IA_B$) linked to the forwarder 48.

FIG. 6 illustrates the Q-link, which connects multiple cells 34, 34', 34" of any type (i.e., read-write, read, or write) to a queue 36 (which is associated with a computing device 18 of a user 12). As mentioned above, the queue 36 has a single queue address QA that is provided to and known by the receiving device 18 that is associated with the queue 36. The Q-link is defined as a tuple (OA, QA, type), where the type indicates whether the sending cell is a read-write cell 34, a read cell 34', or a write cell 34". As such, the Q-link denotes the link(s) one or more output addresses (e.g., $OA_A$, $OA_B$) and the queue 36. The Q-link allows the queue 36 to retrieve messages from multiple output addresses $OA_A$, $OA_B$. The messages at the queue 36 can then be i) pushed to the computing device 18 if the computing device 18 is then-currently connected to the MS facility 14, or ii) stored at the queue 36 and retrieved from the queue 36 when the computing device 18 later becomes connected.

A user 12 may obtain a queue address QA via one of two modes. Using the first mode, the user 12 sends a get queue address query to the MS facility 14. In response, the MS facility 14 (via processor 40) may compute a queue address QA and securely transmit it to the user 12 via his/her computing device 18. Once the user has his/her queue address QA, he/she may generate or delete Q-links as described below. Using the second mode, the user sends one or more output addresses to the MS facility 14 requesting that a queue 36 be generated for the user's computing device and associated with the listed output addresses. In response, the MS facility 14 (via processor 40) may compute a queue address QA, securely transmit it to the user 12 via his/her computing device 18, and generate the requested Q-links using the newly generated queue address QA.

The Q-link may be added or removed (e.g., by a user 12, who may be an individual and/or group manager) by sending an appropriate query to the MS facility 14, where the control service 46 in conjunction with the processor 40 process the query and generate a link or delete the link when the appropriate information is provided by the user 12. Each of the add Q-link query and the delete Q-link query require the output address $OA_A$ or $OA_B$ of the sending cell 34, 34', 34", A or B, the queue address QA, and the cell type of the sending cell 34, 34', 34", A or B. To make or break a Q-link between cell A and the queue 36, the query would include ($OA_A$, QA, cell type of A). Similarly, to make or break a Q-link between cell B and the queue 36, the query would include ($OA_B$, QA, cell type of B). Generically, to link or unlink a cell 34, 34', 34" to or from a queue 36, the tuple (OA, QA, cell type associated with OA) is provided to the MS facility 14.

The control service 46 of the MS facility 14 may also be programmed to allow Q-links to be viewed by certain user(s) 12. The control service 46 in conjunction with the processor 40 allows viewing of the Q-links associated with a queue 36 by processing a query that specifies the queue address QA. Q-links may not be viewed when the query includes the output address(es) $OA_A$ or $OA_B$ of the sending cells 34, 34', 34", A or B. As such, when a user 12 wishes to view all Q-links associated with his/her queue 36, he/she may send a get Q-link query to the MS facility 14 which includes his/her queue address QA. The user 12 may send the get Q-link query message (e.g., GetQLinks(QA)) to the MS facility 14, in the form of, for example, an HTTP message or a confidential and secure messaging system which can assure that the message remains confidential. The MS facility 14 takes the valid queue address QA and outputs all of the output addresses (e.g., $OA_A$, $OA_B$) linked to the queue 36.

It is to be understood that all of the queries described in reference to FIGS. 4-6 are designed so that the MS facility 14 does not leak information that was not known at some point to the user/entity 12 sending the query. As such, the queries enable the metadata about a collection of cells to be securely and reliably obtained from the MS facility 14.

The various cells 34, 34', 34", links C-link, F-link, Q-link, and queries may be used to control communications among an unmanaged group or a managed group that includes multiple system users 12. Generally, users 12 can send messages either to an associated forwarder 48 or to the input address IA of a cell (i.e., RW cell 34 or R cell 34' or W cell 34"). The outputs from a sending RW cell 34 are transferred to other RW cells, 34' and/or to a queue 36 linked with the sending RW cell 34' and associated with a targeted receiving RW cell 34. The outputs from a sending R cell 34' or W cell 34" are transferred to a queue 36 linked with the sending cell 34' or 34". In an unmanaged group, there is no manager, and so links created within the group are controlled by the individual users in the group. An example of the creation of an unmanaged group and communications that may take place within an unmanaged group is shown and/or described in reference to FIG. 7. In a managed group, there is a group manager, and links may be created and controlled by the group manager because he/she may have the sequence of addresses used in the group. An example of the creation of a managed group is shown in FIG. 8, and an example of the communications that may take place within a managed group are shown and described in reference to FIG. 9. Multiple groups may overlap, and more than one manager may create and control these groups. An example of overlapping groups is shown and described in reference to FIG. 10.

Unmanaged groups may include and/or utilize all types of cells 34, 34', 34" (RW, R, and W) and links (C, Q, and/or F), and managed groups may include and/or utilize all types of cells 34, 34', 34" (RW, R, and W) and links (C, Q, and/or F).

Figure 7:
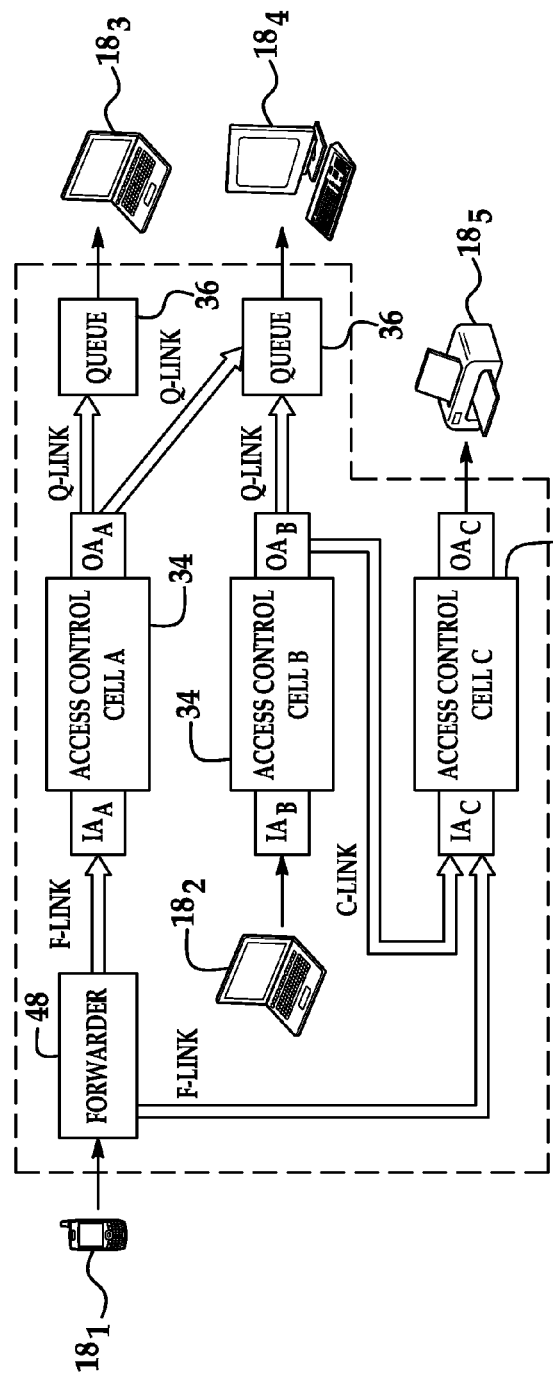
FIG. 7 is a schematic diagram illustrating an example of an unmanaged group including F-link(s), C-link(s), and Q-link(s)
Figure 8:
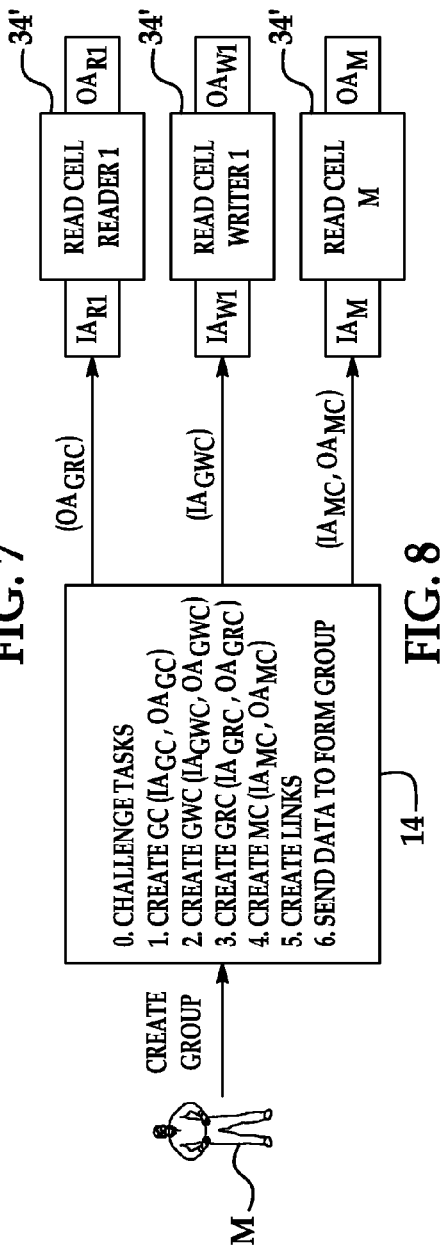
FIG. 8 is a schematic diagram illustrating an example of how a managed group can be created.

FIG. 7 illustrates example links that may be created within an unmanaged group of the MS facility 14. In the example shown in FIG. 7, all of the control access cells 34, A, B, C are read-write cells having respective input and output addresses $IA_A$, $OA_A$, $IA_B$, $OA_B$, and $IA_A$, $OA_A$ that are cryptographic numbers created using the secret key K, 38.

The computing device $18_1$ has set up a forwarder 48 by sending a get forwarder address query to the MS facility 14. In response, the MS facility 14, via processor 40, computes a randomized unique forwarder address FA that is securely transmitted to the computing device $18_1$, and thus is known only by the user of the computing device $18_1$. The user of the computing device $18_1$ has created F-links between his/her forwarder 48 and access control cells A and C by sending respective create F-link queries to the MS facility 14. The information included in these queries is (FA, $IA_A$, cell type of A) and (FA, $IA_C$, cell type of C). In response to these queries, the MS facility 14 creates F-links between the forwarder 48 and respective cells 34, A and 34, C.

In an example, each of the cells 34, A and 34, C may have been created by the MS facility 14 in response to a get cell query made by the user of computing device $18_1$ in accordance with the example set forth and described in reference to FIG. 3A. The user of computing device $18_1$ may transmit his/her input address(es) $IA_A$, $IA_C$ to another user (e.g., user of computing device $18_2$) in order to allow the other user to write to his/her cell(s) 34, A and/or 34, C. With the knowledge of the input address(es) $IA_A$, $IA_C$, the user of the computing device $18_2$ may send a message containing the respective input address(es) $IA_A$ or $IA_C$, to the respective access control cell 34, A or 34, C. In the example shown in FIG. 7, the user of computing device $18_1$ shares the input address $IA_C$ of cell 34, C, which, as will be described further hereinbelow, may be used to create a C-link between cells 34, B and 34, C. The user of computing device $18_1$ may also transmit his/her output address(es) $OA_A$, $OA_C$ to another user (e.g., user of computing device $18_3$, $18_4$, or $18_5$) in order to allow the other user to read from his/her cell(s) 34, A and/or 34, C. With the knowledge of the output address(es) $OA_A$, $OA_C$, the user of the other computing device (e.g., $18_3$, $18_4$, or $18_5$) may receive messages sent from the output address(es) $OA_A$, $OA_C$. In the example shown in FIG. 7, the user of computing device $18_1$ shares the output address $OA_C$ of cell 34, C with the computing device $18_5$ so that computing device $18_5$ receives all messages sent through the access control cell 34, C.

FIG. 7 also illustrates an access control cell 34, B created by the MS facility 14 in response to a get cell query made by the user of computing device $18_2$ in accordance with the example set forth and described in reference to FIG. 3A. The user of computing device $18_2$ may also share the input address $IA_B$ and/or output address $OA_B$ of cell 34, B in order to control writing to or reading from his/her cell 34, B. In this example, the user of computing device $18_2$ may share his/her output address $OA_B$ with the user of computing device $18_4$ so that a Q-link may be generated, as will be discussed further below.

In this example, the user of computing device $18_2$ has requested that a C-link be created between access control cell 34, B and access control cell 34, C. More particularly, the user of computing device $18_2$ provides the tuple (($IA_B$, $OA_B$), $IA_C$) to the control service 46, and in conjunction with the processor 40, the control server 46 processes the query and generates the requested C-link.

FIG. 7 also illustrates Q-links between the access control cell 34, A and two different queues 36 (the queue 36 associated with computing device $18_3$ and the queue 36 associated with computing device $18_4$), and a Q-link between the access control cell 34, B and the queue 36 associated with computing device $18_4$. The computing devices $18_3$ and $18_4$ have each set up a respective queue 36 by sending a respective get queue address query to the MS facility 14. In response to each query, the MS facility 14, via processor 40, computes a randomized unique queue address QA that is securely transmitted to the respective computing device $18_3$ and $18_4$, and thus is known only by the user of the respective computing device $18_3$ and $18_4$. The user of the computing device $18_3$ has created a Q-link between his/her queue 36 and access control cell 34, A by sending a create Q-link query to the MS facility 14. The information included in this query is (QA, $OA_A$, cell type of A), where QA is the queue address for the queue associated with computing device $18_3$. In response to this query, the MS facility 14 creates the Q-link between the queue 36 associated with the computing device $18_3$ and the cell 34, A. Similarly, the user of the computing device $18_4$ has created respective Q-links between his/her queue 36 and access control cells 34, A and 34, B by sending respective create Q-link queries to the MS facility 14. The information included in these queries is (QA, $OA_A$, cell type of A) and (QA, $OA_B$, cell type of B), where QA is the queue address for the queue associated with computing device $18_4$. In response to this query, the MS facility 14 creates a Q-link between each of i) the queue 36 associated with the computing device $18_4$ and cell 34, A and ii) the queue 36 associated with the computing device $18_4$ and cell 34, B.

In this example, all messages sent by computing device $18_1$ are received by computing devices $18_3$, $18_4$, and $18_5$, and all messages sent by computing device $18_2$ are received by computing devices $18_4$ and $18_5$.

Referring now to FIG. 8, when it is desirable to create a group, a group manager M and the MS facility 14 perform multiple tasks. In general, when it is desirable to create a managed group, the manager M needs at least the public key Y of any reader to be added to the group, the public key Y of any writer to be added to the group, the manager's own public key Y, and the manager's own private key.

At the outset of group creation, the manager M obtains a challenge from the MS facility 14. The challenge is computed at the MS facility 14 from a secret random number and the current timestamp on the processor 40. The timestamp may be updated at predetermined intervals, e.g., every 5 minutes, which can be set and changed at the MS facility 14. The timestamp is included in the challenge to ensure that the creation request is fresh (i.e., not outdated). The manager M signs the challenge with his/her private key, and then sends the following information to the MS facility 14 as part of the group creation request: the public keys Y of any readers to be added to the group, the public keys Y of any writers to be added to the group, the manager's own public key Y, any desirable group name and/or description, the challenge, and the manager's signature on the challenge.

To avoid replay attacks, upon receiving the group creation request and the associated information, the MS facility 14 verifies that the challenge is current by cross-checking the timestamp in the challenge with the timestamp at the MS facility 14. The MS facility maintains a timestamp (ts) that is updated every T seconds, where T is an implementation parameter and may be any desirable value (e.g., 10 seconds, 60 seconds, 300 seconds, etc.). If the timestamp within the challenge is current (i.e., matches the timestamp (ts) with the MS facility 14), the MS facility 14 accepts the request and performs multiple tasks in accordance with the request. In an example, the MS facility 14 will accept a group creation request when the timestamp in the request matches the timestamp at the MS facility 14. In other words, the creator obtains a challenge and responds to the challenge within the time T specified above, otherwise the request will be deemed non-current and will be rejected.

When the group creation request is accepted, the MS facility 14 (e.g., via processor 40) creates a read-write cell 34 for the group, which will be referred to as the group cell GC. Since the group cell GC is a read-write cell 34, the MS facility 14 also generates a randomized input address $IA_{GC}$ and a randomized output address $OA_{GC}$ of the group cell GC. It is to be understood that multiple group cells GC may be generated depending upon the requested structure of the group.

The processor 40 of the MS facility 14 then generates a read-write cell 34 for each writer identified in the request by his/her public key Y, and a read-write cell 34 for each reader identified in the request by his/her public key Y. The cell(s) 34 generated for the writer(s) is/are referred to as group write cell(s) GWC, and the cell(s) 34 generated for the reader(s) is/are referred to as group read cell(s) GRC. Since each group write cell GWC and each group read cell GRC is a read-write cell 34, the MS facility 14 also generates respective randomized input addresses $IA_{GWC}$, $IA_{GRC}$ and respective randomized output addresses $OA_{GWC}$, $OA_{GRC}$ of the cells GWC, GRC. It is to be understood that multiple group write and/or read cells GWC, GRC may be generated depending upon the requested structure of the group.

The processor 40 also generates a read-write cell for the manager M, which is referred to as a manager cell MC. Since the manager cell MC is a read-write cell 34, the MS facility 14 also generates a randomized input address $IA_{MC}$ and a randomized output address $OA_{MC}$ of the manager cell MC.

Any group write cell GWC may then be connected with the group cell GC via a C-link so that messages sent to each group write cell GWC (from a writer having the input address $IA_{GWC}$) are sent to the input address $IA_{GC}$ of the group cell GC. This C-link connects the output address $OA_{GWC}$ of a group write cell GWC with the input address $IA_{GC}$ of the group cell GC. Any group read cell GRC may then be connected with the group cell GC via a C-link so that messages coming from the group cell GC will be sent to the input address $IA_{GRC}$ of the group read cell GRC. This C-link connects the output address $OA_{GC}$ of the group cell GC with the input address $IA_{GRC}$ of group read cell GRC.

As shown in FIG. 8, respective sets of information are sent to potential group writers, potential group readers, and the manager via their respective read cells 34' as invitations to join the group. These read cells 34' had been generated via the method described in reference to FIG. 3B, and the input address $IA_{R1}$, $IA_{W1}$, $IA_M$ of the respective read cells 34' (i.e., the read cells of reader 1, writer 1, and manager M in FIG. 8) may be computed from the public key Y of the reader, the writer, and the manager, respectively. For example, the input address $IA_{R1}$ of the reader 1 may be calculated using the hash function and the reader's public key Y. The information in the invitation sent to any reader may include the output address $OA_{GRC}$ of his/her corresponding group read cell GRC and auxiliary information (i.e., the public key of the manager, the signature of the manager, and the group name and/or description). The information in the invitation sent to any writer may include the input address $IA_{GWC}$ of his/her corresponding group write cell GWC and the auxiliary information. The information in the invitation sent to the manager M may include the input address $IA_{MC}$ of his/her corresponding manager cell MC and the auxiliary information.

The MS facility 14 may save all of the input addresses (e.g., $IA_{GWC}$, $IA_{GRC}$, $IA_{MC}$) and the group cell GC (including its input and output addresses $IA_{GC}$, $OA_{GC}$) in the data storage device 42.

It is assumed that potential group members are a priori listening to the output addresses $OA_{R1}$, $OA_{W1}$, $OA_M$ of the respective read cells 34', and thus receive the respective invitations on their respective read cells 34' when sent by the MS facility 14. It is to be understood that the MS facility 14 does not verify the manager's signature. Rather, the signature verification may be accomplished by the potential group members upon receiving the invitation to join the group. The potential group members may use the signature to ensure that the invitation is fresh/current and to ensure that the request indeed originates from the manager M. Each potential group member can then independently decide whether to join the group or not join the group depending, at least in part, upon whether he/she trusts the manager M.

Readers may join the group by subscribing the output address $OA_{GRC}$ of their group read cell GRC to their existing data queue 36, or they may request a data queue 36 as described above and then subscribe the output address $OA_{GRC}$ of their group read cell GRC to their newly acquired data queue 36. In other words, the readers may request that a Q-link be formed between the received output address $OA_{GRC}$ and their queue.

Writers may join the group by saving the input address $IA_{GWC}$ of their group write cell GWC and using the input address $IA_{GWC}$ to write to the group when it is desirable.

The manager M may use the input address $IA_{MC}$ of the manager cell MC to edit membership of the group. In some examples disclosed herein, the management cell MC may not be used for routing and/or messaging, but rather the input address $IA_{MC}$ is used as a common secret between the MS facility 14 and the manager M. This allows the manager M to edit the group (i.e., add members, delete members, and/or destroy the group). The manager M uses the secret input address $IA_{MC}$ of his/her manager cell MC to request that a change be made to the group. Upon receiving the edit request, the MS facility 14 checks that the requesting entity has the correct capability (i.e., the input address $IA_{MC}$ of his/her manager cell MC). In order to add member(s) to the group, the manager M first obtains a challenge from the MS facility 14 (similar to when creating the group) and attach his/her signature on the add request. This ensures that each added member can independently authenticate the manager M and decide if he/she wants to join the group. In order to remove member(s) or to destroy the group, no such challenge is required by the MS facility 14. In some other examples disclosed herein, the management cell MC may also or alternatively be used for routing and/or messaging.

Figure 9:
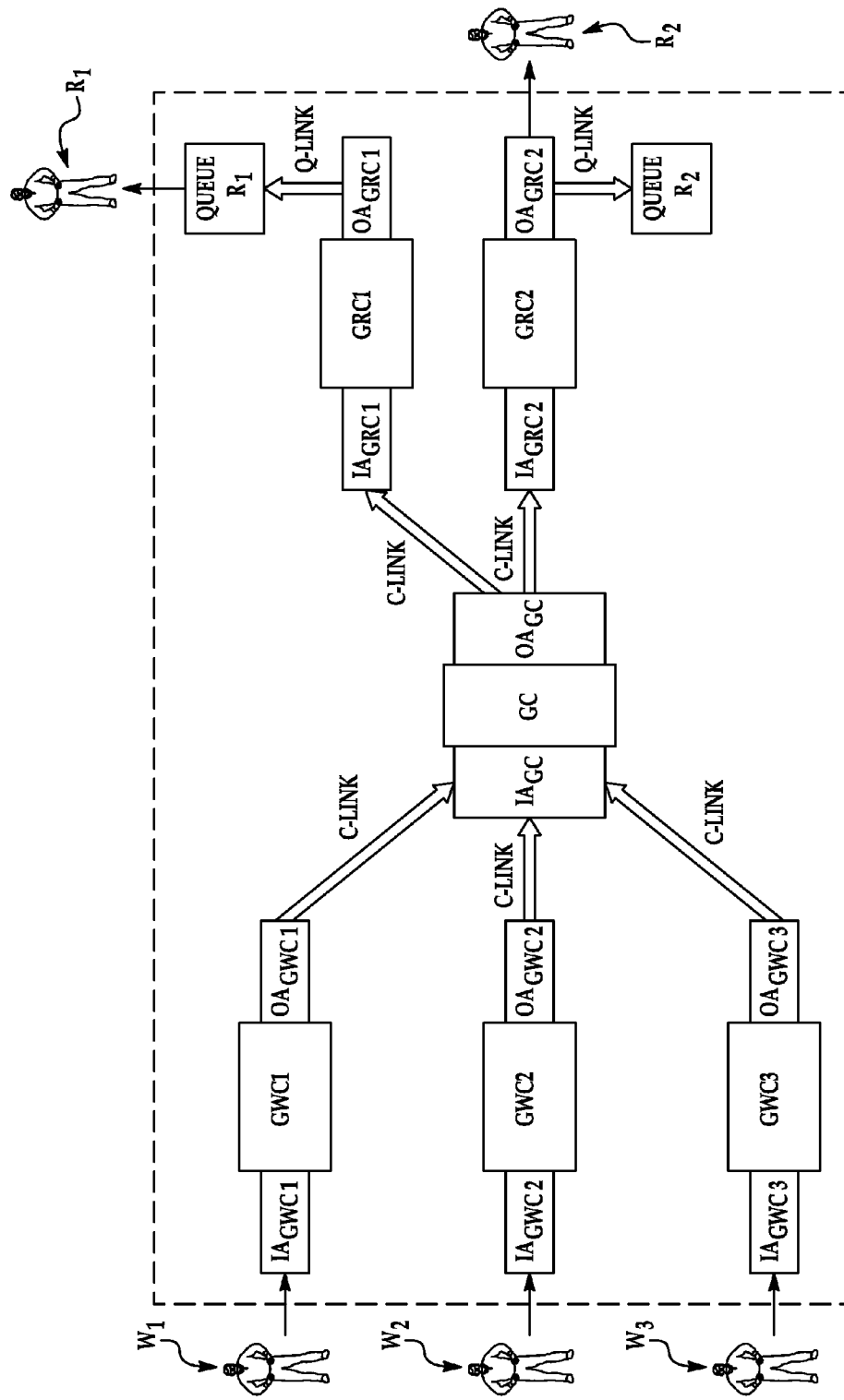
FIG. 9 is a schematic diagram illustrating an example of a managed group.

Referring now to FIG. 9, an example of a managed group formed using the method described in reference to FIG. 8 is depicted. In this example, the group includes a single group cell GC, three writers $W_1$, $W_2$, and $W_3$, and two readers $R_1$ and $R_2$. While not shown, it is to be understood that each of the writers $W_1$, $W_2$, and $W_3$ has a computing device that enables the writers $W_1$, $W_2$, and $W_3$ to interact with the MS facility 14 and write to the group cell GC. Also while not shown, it is to be understood that each of the readers $R_1$ and $R_2$ has a computing device that enables the readers $R_1$ and $R_2$ to interact with the MS facility 14 and read messages from the group cell GC.

Upon accepting his/her invitation to the group shown in FIG. 9, each of the writers $W_1$, $W_2$, and $W_3$ receives his/her respective group write cell input address $IA_{GWC1}$, $IA_{GWC2}$, and $IA_{GWC3}$. As such, the first writer $W_1$ may transmit a message to his/her group write cell GWC1, and because this group write cell GWC1 has been C-linked to the group cell GC (e.g., by the manager M during group creation), the message will be transmitted to the group cell GC. Similarly, any messages written by the second and third writers $W_2$ and $W_3$ to his/her group write cell GWC2 and GWC3 will be transmitted to the group cell GC.

Upon accepting his/her invitation to the group shown in FIG. 9, each of the readers $R_1$ and $R_2$ receives his/her respective group read cell output address $OA_{GRC1}$ and $OA_{GRC2}$. As described above, the readers $R_1$ and $R_2$ link their respective queues (e.g., queue $R_1$ and queue $R_2$) to their respective group read cell output address $OA_{GRC1}$ and $OA_{GRC2}$. Since the group read cells GRC1 and GRC2 have been C-linked to the group cell GC (e.g., by the manager M during group creation), the messages received by the group cell GC will be forwarded to the respective read cells GRC1 and GRC2 and the linked queues of $R_1$ and $R_2$.

In the example shown in FIG. 8, all messages sent by writers $W_1$, $W_2$, and $W_3$ are received by readers $R_1$ and $R_2$.

It is to be understood that multiple groups may interact with one another. In these instances, different group managers may work together to create the groups and to control the communications within the groups. An example of multiple interacting groups is shown in FIG. 10.

Figure 10:
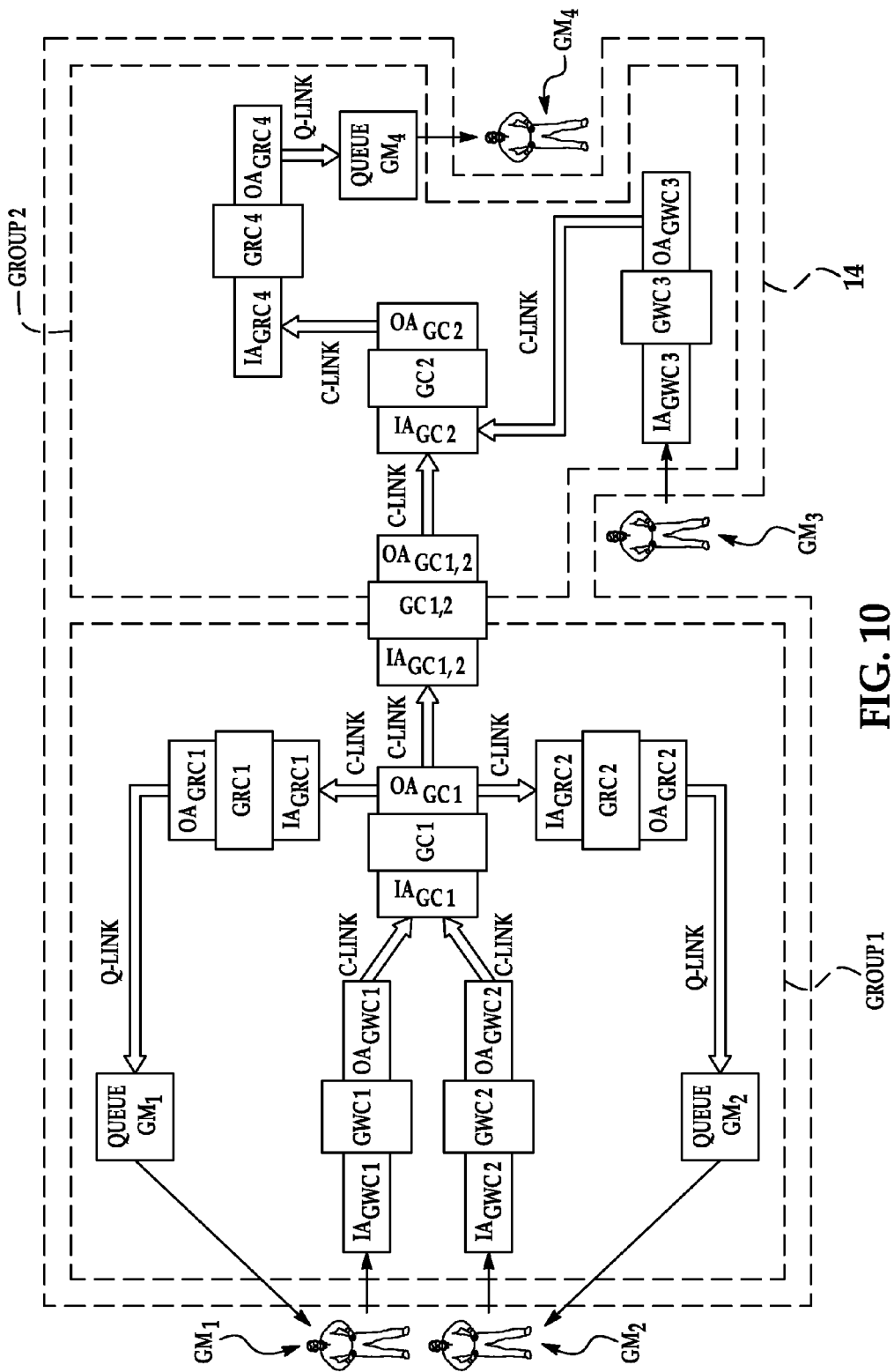
FIG. 10 is a schematic diagram illustrating another example of a managed group.

In the example shown in FIG. 10, two overlapping groups (group 1 and group 2) are in communication using the MS facility 14. There are four group members $GM_1$, $GM_2$, $GM_3$, and $GM_4$. Group members $GM_1$ and $GM_2$ are part of the first group and are both writers and readers within the first group. Group members $GM_3$ and $GM_4$ are part of the second group, where group member $GM_3$ is a writer and group member $GM_4$ is a reader of that group. It is to be understood that group member $GM_4$ is also a reader of the first group by virtue of a group cell that is shared by the groups (i.e., $GC_{1,2}$). This will be described further hereinbelow.

While not shown in FIG. 10, it is to be understood that each of the group members $GM_1$, $GM_2$, $GM_3$, and $GM_4$ has a computing device that respectively enables i) the writers $GM_1$, $GM_2$ to interact with the MS facility 14 and write to the first group cell GC1, ii) the readers $GM_1$, $GM_2$ to interact with the MS facility 14 and read from the first group cell GC1, iii) the writer $GM_3$ to interact with the MS facility 14 and write to the second group cell GC2, and iv) the reader $GM_4$ to interact with the MS facility 14 and read from the second group cell GC2.

Within the first group, upon accepting his/her invitation to the first group, each of the group members $GM_1$ and $GM_2$ receives his/her respective group write cell input address $IA_{GWC1}$, $IA_{GWC}2$, and his/her respective group read cell output address $OA_{GRC1}$, $OA_{GRC2}$. As such, in an example, the group member $GM_1$ may transmit a message to his/her group write cell GWC1, and because this group write cell GWC1 has been C-linked to the first group cell GC1 (e.g., by a first manager during first group creation), the message will be transmitted to the first group cell GC1. Similarly, any messages written by the second group member $GM_2$ to his/her group write cell GWC2 will be transmitted to the first group cell GC1. Furthermore, since the first group read cells GRC1 and GRC2 have been C-linked to the first group cell GC1 (e.g., by the first manager during first group creation), the messages received by the group cell GC1 will be forwarded to the respective read cells GRC1 and GRC2 and the linked queues of group members $GM_1$ and $GM_2$.

In this example, managers of the respective groups may work together to determine how to link the groups in a desirable manner (e.g., who from the second group can read from the first group, etc.). In the example shown in FIG. 10, the groups 1 and 2 are linked by a shared group cell $GC_{1,2}$, which is respectively C-linked to each of the first group cell GC1 and the second group cell GC2. As such, any messages received by the first group cell GC1 will be forwarded to the shared group cell $GC_{1,2}$ and then forwarded from the shared group cell $GC_{1,2}$ to the second group cell GC2.

Within group 2, upon accepting his/her invitation to join the second group, the group member $GM_3$ receives his/her group write cell input address $IA_{GWC}3$. As such, the group member $GM_3$ may transmit a message to his/her group write cell GWC3, and because this group write cell GWC3 has been C-linked to the second group cell GC2 (e.g., by the second manager during second group creation), the message will be transmitted to the second group cell GC2. Also within group 2, upon accepting his/her invitation to join the second group, the group member $GM_4$ receives his/her group read cell output address $OA_{GRC4}$. As described above, the group member $GM_4$ may link his/her respective queue (e.g., queue $GM_4$) to his/her group read cell output address $OA_{GRC4}$. Since the group read cells GRC4 has been C-linked to the second group cell GC2 (e.g., by the second manager M2 during second group creation), any messages received by the second group cell GC2 will be forwarded to the read cell GRC4 and the linked queue of $GM_4$.

In the example shown in FIG. 10, all messages sent by group members $GM_1$ and $GM_2$ are received by group members $GM_1$, $GM_2$ and $GM_4$, and all messages sent by group member $GM_3$ are received by group member $GM_4$.

The groups shown in FIGS. 9 and 10, writer(s) are allowed to write messages, reader(s) are allowed to read messages, and manager(s) are allowed to edit the groups. In some instances, a user may be both a reader and a writer.

It is to be understood use of the words "a" and "an" and other singular referents include plural as well, both in the specification and claims.

While several examples have been described in detail, it will be apparent to those skilled in the art that the disclosed examples may be modified. Therefore, the foregoing description is to be considered non-limiting.

What is claimed is:

1. A communication access control system, comprising:
a messaging service facility; and
a computing system of the messaging service facility, the computing system having a permanent memory and hosting:
a plurality of access control cells, each of the access control cells having an input address and an output address;
a messaging service to send messages between at least some of the plurality of access control cells; and
a control service to define a link selected from:
a C-link to connect the output address of a first read-write cell of the plurality of access control cells to the input address of a second read-write cell of the plurality of access control cells;
an F-link to connect a forwarder address with the input address of at least one of the plurality of access control cells; and
a Q-link to connect the output address of at least one of the plurality of access control cells to a queue address.

2. The communication access control system as defined in claim 1, further comprising a group structure represented by some of the plurality of access control cells, at least one forwarder address, and at least one queue address, wherein connections within the group structure are made via any of the C-link, the F-link, or the Q-link.

3. The communication access control system as defined in claim 2 wherein the group structure includes a group manager cell having a group-management input address and a group-management output address, and wherein the group-management input and output addresses connect the some of the plurality of access control cells that are part of the group structure.

4. The communication access control system as defined in claim 1 wherein the messaging service includes a forwarder that is associated with the forwarder address to copy a message received at the forwarder address to any input address connected to the forwarder address via the F-link, wherein the forwarder is hosted on the computer system having the permanent memory.

5. The communication access control system as defined in claim 1 wherein the messaging service includes a queue that is associated with the queue address to retrieve a message received from any output address connected to the queue address via the Q-link, wherein the queue is hosted on the computer system having the permanent memory.

6. A method for controlling messaging, comprising:
receiving, via a processor at a messaging service facility, a request to make a connection within the messaging service facility; and
via the processor, creating a link to make the connection, the link being selected from:
a C-link to connect an output address of a first access control cell to an input address of a second access control cell, wherein each of the first and second access control cells are read-write cells;
an F-link to connect a forwarder address to an input address of an access control cell, both the forwarder address and the input address being known by a user requesting the connection; and
a Q-link to connect an output address of an access control cell to a queue address, both the output address and the queue address being known by a user requesting the connection;
wherein the access control cells and the links are hosted on a computer system having the processor and permanent memory.

7. The method as defined in claim 6 wherein the request is to create the C-link, and wherein the request includes an input address and the output address of the first access control cell and the input address of the second access control cell.

8. The method as defined in claim 6 wherein the request is to create the F-link, and wherein the request includes the forwarder address and the input address of the access control cell.

9. The method as defined in claim 6 wherein the request is to create the Q-link, and wherein the request includes the queue address and the output address of the access control cell.

10. The method as defined in claim 6, further comprising:
receiving, via the processor, a query to discover links in the messaging service facility; and any of:
generating, via the processor, a list of all input addresses linked to the forwarder address when the forwarder address is supplied with the query;
generating, via the processor, a list of all input addresses linked to a cell when the cell's input address and output address are supplied with the query; or
generating, via the processor, a list of all output addresses linked to the queue address when the queue address is supplied with the query.

11. The method as defined in claim 6, further comprising:
receiving, via the processor, a request to create a group; and
via the processor, creating the group per the request utilizing any of the C-link, the F-link, or the Q-link.

12. The method as defined in claim 11 wherein creating the group is accomplished by:
generating a read-write cell for the group;
generating a read-write cell for each of: a writer of the group and a reader of the group;
creating a C-link from the read-write cell for the writer to the read-write cell for the group so that messages coming from an output address of the read-write cell for the writer will be sent to an input address of the read-write cell for the group;
creating a C-link from the read-write cell for the group to the read-write cell for the reader so that message coming from an output address of the read-write cell for the group will be sent to an input address of the read-write cell for the reader;
transmitting an output address of the read-write cell for the reader to a read cell of the reader; and
transmitting an input address of the read-write cell for the writer to a read cell of the writer.

13. The method as defined in claim 11 wherein creating the group is accomplished by:
creating respective F-links from the forwarder address to input addresses of at least two different access control cells; and
creating respective Q-links from the output addresses of the at least two different access control cells to the queue addresses associated with respective receiving devices.

14. A computer program product comprising a non-transitory, tangible computer readable storage medium having computer readable instructions embodied thereon, the computer readable instructions, when executed by a processor of a messaging service facility, cause the processor to:
receive a request to make a connection within the messaging service facility; and
create a link to make the connection, the link being selected from:
a C-link to connect an output address of a first access control cell to an input address of a second access control cell, wherein each of the first and second access control cells are read-write cells;
an F-link to connect an input address of an access control cell to a forwarder address that is known by a user requesting the connection; and
a Q-link to connect an output address of an access control cell to a queue address that is known by a user requesting the connection;
wherein the access control cells and the links are embodied on the non-transitory, tangible computer readable medium.

15. The computer program product as defined in claim 14, further comprising computer readable instructions, when executed by the processor of the messaging service facility, that cause the processor to:
receive a query to discover links in the messaging service facility; and any of:
generate a list of all input addresses linked to the forwarder address when the forwarder address is supplied with the query;
generate a list of all input addresses linked to a cell when the cell's input address and output address are supplied with the query; or
generate a list of all output addresses linked to the queue address when the queue address is supplied with the query.

* * * * *

UNITED STATES PATENT AND TRADEMARK OFFICE
CERTIFICATE OF CORRECTION

| | | |
|---|---|---|
| PATENT NO. | : 9,160,750 B2 | Page 1 of 1 |
| APPLICATION NO. | : 14/345325 | |
| DATED | : October 13, 2015 | |
| INVENTOR(S) | : Viswanathan Kapaleeswaran et al. | |

It is certified that error appears in the above-identified patent and that said Letters Patent is hereby corrected as shown below:

In column 1, lines 3-7, in Specification, after "COMMUNICATION ACCESS CONTROL SYSTEM", insert -- CROSS-REFERENCE TO RELATED APPLICATION This application is a U.S. National Stage Application of and claims priority to International Patent Application No. PCT/IN2011/000731, filed on October 24, 2011, and entitled "A COMMUNICATION ACCESS CONTROL SYSTEM". --, therefor.

Signed and Sealed this
Eighth Day of March, 2016

Michelle K. Lee
*Director of the United States Patent and Trademark Office*